US012662336B2

(12) United States Patent
Testoni et al.

(10) Patent No.: US 12,662,336 B2
(45) Date of Patent: Jun. 23, 2026

(54) TRANSPORT SYSTEM FOR AN ARTICLE

(71) Applicant: G.D SOCIETA' PER AZIONI, Bologna (IT)

(72) Inventors: Luca Testoni, Castelmaggiore (IT); Paolo Degliesposti, Bologna (IT); Luca Lanzarini, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 41 days.

(21) Appl. No.: 18/721,909

(22) PCT Filed: Dec. 1, 2022

(86) PCT No.: PCT/IB2022/061654
§ 371 (c)(1),
(2) Date: Jun. 20, 2024

(87) PCT Pub. No.: WO2023/119027
PCT Pub. Date: Jun. 29, 2023

(65) Prior Publication Data
US 2025/0051106 A1    Feb. 13, 2025

(30) Foreign Application Priority Data

Dec. 21, 2021    (IT) ........................ 102021000031904

(51) Int. Cl.
B65G 54/02        (2006.01)
A24F 40/70        (2020.01)
(Continued)

(52) U.S. Cl.
CPC .............. B65G 54/02 (2013.01); A24F 40/70 (2020.01); B65G 17/12 (2013.01); B65G 47/61 (2013.01); B65G 47/842 (2013.01)

(58) Field of Classification Search
CPC ...... B65G 47/842; B65G 47/61; B65G 17/12; B65G 54/02; A24F 40/70
(Continued)

(56) References Cited

U.S. PATENT DOCUMENTS 6,705,217 B1 *    3/2004  Godsey ................. B41F 17/001
                                                    269/170
9,067,306 B1 *    6/2015  Lee ........................... B25B 1/02
(Continued)

FOREIGN PATENT DOCUMENTS

EP           4357275 A1 *   4/2024   ............. B65G 47/90
WO     WO-2018/172376 A1      9/2018
(Continued)

OTHER PUBLICATIONS

International Application No. PCT/IB2022/061654, International Search Report and Written Opinion, mailed Mar. 3, 2023.

*Primary Examiner* — James R Bidwell
(74) *Attorney, Agent, or Firm* — MARSHALL, GERSTEIN & BORUN LLP

(57)        ABSTRACT

Transport system (6) for an article (1) having: a movable unit (7) provided with at least one seat (8), which is designed to contain the article (1), is delimited by a first wall (11) and by a second wall (12) facing one another and opposite one another, so that the article (1) can be housed between the first wall (11) and the second wall (12), and has an elastic element (13) pushing the two walls (11, 12) towards one another: a conveyor (9), which is designed to move the movable unit (7) along a path (P); and an operating device (15), which is on the outside and independent of the movable unit (7), is arranged along the path (P), and is designed to act upon the first wall (11) in order to move the first wall (11) away from the second wall (12) against the force generated by the elastic element (13). The first wall (11) is mounted on the movable unit (7) in a sliding manner to linearly slide
(Continued)

relative to the movable unit (7). The movable unit (7) has a control appendage (14) which is rigidly connected to the first wall (11) and is designed to be moved by the operating device (15) relative to the rest of the movable unit (7) to change the distance of the first wall (11) relative to the second wall (12).

16 Claims, 4 Drawing Sheets

(51) Int. Cl.
   *B65G 17/12*     (2006.01)
   *B65G 47/61*     (2006.01)
   *B65G 47/86*     (2006.01)

(58) Field of Classification Search
   USPC ......................................... 198/867.07, 803.9
   See application file for complete search history.

(56) References Cited

U.S. PATENT DOCUMENTS

| | | | |
|---|---|---|---|
| 10,404,027 | B2 | 9/2019 | Porter |
| 2005/0103604 | A1 | 5/2005 | Hartness et al. |
| 2020/0354166 | A1* | 11/2020 | Abe .......................... B65H 5/14 |
| 2021/0122576 | A1 | 4/2021 | Jones et al. |
| 2022/0002089 | A1 | 1/2022 | Begin et al. |
| 2023/0257215 | A1* | 8/2023 | Bosboom ............... B65G 47/90 |
| | | | 414/751.1 |

FOREIGN PATENT DOCUMENTS

| | | |
|---|---|---|
| WO | WO-2020094804 A1 | 5/2020 |
| WO | WO-2020250196 A1 | 12/2020 |
| WO | WO-2020250197 A1 | 12/2020 |

* cited by examiner

TRANSPORT SYSTEM FOR AN ARTICLE

CROSS-REFERENCE TO RELATED APPLICATIONS

This Patent Application is the US national stage of International Application No. PCT/IB2022/061654, filed Dec. 1, 2022, which claims priority from Italian Patent Application No. 102021000031904 filed on Dec. 21, 2021, the entire disclosure of which is incorporated herein by reference.

TECHNICAL FIELD

The present invention relates to a transport system for an article.

The present invention finds advantageous application in the production of a cartridge for electronic cigarettes (a cartridge which can be at least partially complete, namely, can be totally complete or without one or more elements), to which the following disclosure will make explicit reference without thereby losing generality.

PRIOR ART

A machine for manufacturing cartridges for electronic cigarettes comprises a transport system which is designed to move the cartridges along a working path and through a series of working stations in which processing (for example, additions of elements, welding, weighing, optical or electrical controls, bending . . . ) on the cartridges are performed.

The transport system must be able to hold the more or less complete cartridges in a delicate way (so as not to damage the same) and, at the same time, in a sufficiently firm way to guarantee that the cartridges are not lost (or in any case not subject to unwanted shifting) during movement. In particular, to allow the manufacturing machine to reach high hourly productivity (for example of the order of several hundred cartridges produced every minute) it is necessary to impart relatively high accelerations and decelerations to the cartridges which therefore require firm and secure control of the position of the cartridges within the transport system.

Patent application WO2020250196A1 describes a transport system for a cartridge for an electronic cigarette and comprising: a movable unit provided with a seat which is designed to contain the cartridge and is delimited by a first wall and by a second wall facing one another and opposite one another so that the cartridge can be housed between the first wall and the second wall; a conveyor designed to move the movable unit along a path; and an operating device which is on the outside and independent of the movable unit and is arranged along the path. The first wall is mounted in a rotary manner on the movable unit so as to move away and closer (by rotating) from/to the second wall between a gripping position in which the first wall is at a minimum distance from the second wall and a release position in which the first wall it is at a maximum distance from the second wall. The movable unit has an elastic element pushing the first wall towards the second wall and therefore towards the gripping position. The movable unit has a control appendage which is mechanically connected to the first wall, is movable in order to move the first wall away from the second wall and thus move the first wall towards the release position, and is designed to be moved by the operating device when the movable unit is in the area of the operating device.

Patent application US2005103604A1 and patent U.S. Pat. No. 10,404,027B2 describe a transport system for an article comprising: a movable unit provided with at least one seat, which is designed to contain the article, is delimited by a first wall (mounted in a movable manner) and by a second wall, which are facing one another and opposite one another, so that the article can be housed between the first wall and the second wall, and has an elastic element pushing the two walls towards one another; a conveyor, which is designed to move the movable unit along a path; and an operating device, which is on the outside and independent of the movable unit, is arranged along the path, and is designed to act upon the first wall in order to move the first wall away from the second wall against the force generated by the elastic element.

DESCRIPTION OF THE INVENTION

The object of the present invention is to provide a transport system for an article that allows to hold even an article of a particular shape in a stable and precise manner and which is, at the same time, easy and inexpensive to produce.

According to the present invention a transport system for an article as claimed in the appended claims is provided.

The claims describe embodiments of the present invention forming an integral part of the present description.

BRIEF DESCRIPTION OF THE DRAWINGS

The present invention will now be described with reference to the attached drawings, which illustrate a non-limiting embodiment thereof, wherein.

PREFERRED EMBODIMENTS OF THE INVENTION

Figure 1:
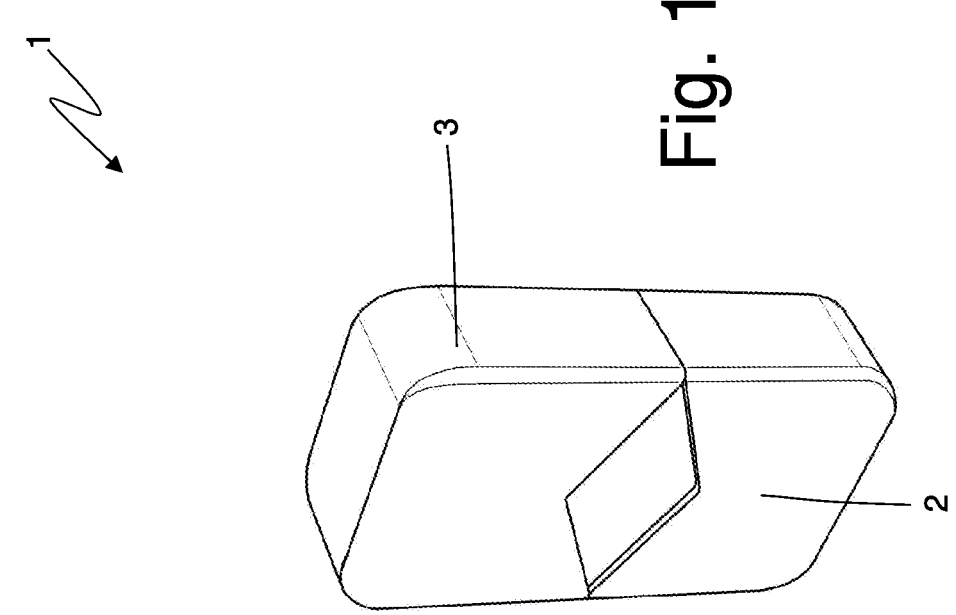
FIG. 1 is a perspective view of a cartridge for an electronic cigarette.
Figure 2:
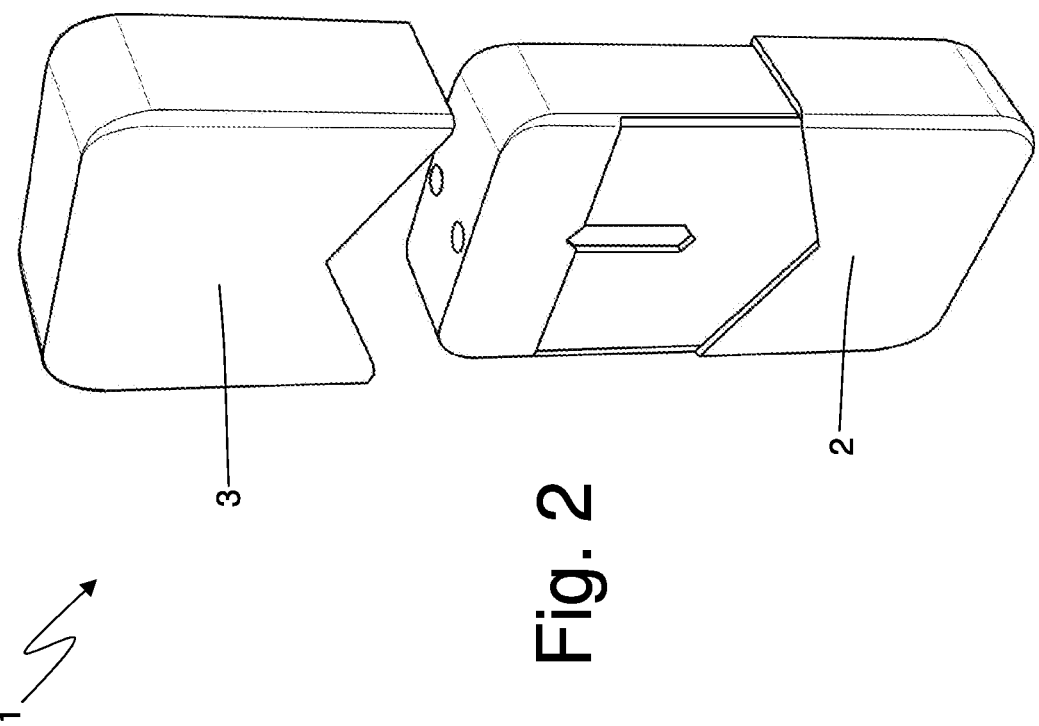
FIG. 2 is a perspective view of the cartridge of FIG. 1 with the removal of a removable cap.

Number 1 in FIGS. 1 and 2 denotes, as a whole, a single-use cartridge (namely, disposable, which is therefore used only once and is then replaced) of a known type for an electronic cigarette.

The electronic cigarette comprises a reusable parallelepiped-shaped portion which is used several times and contains, among other things, an electric battery (which supplies the energy necessary for the functioning of the electronic cigarette) and an electronic processor which supervises the functioning of the electronic cigarette; a new disposable cartridge 1 is coupled to the reusable portion to be used (namely, to be "smoked") and is thrown away after use to be replaced with a new disposable cartridge 1.

The cartridge 1 comprises a substantially parallelepiped-shaped main body 2 which in use is coupled to an electronic cigarette from which it receives electrical power by way of two electrical contacts arranged at a smaller base of the main body. Furthermore, the cartridge 1 comprises a cap 3 which slips onto the main body 2 to cover the area in which the two electrical contacts are arranged.

Figure 3:
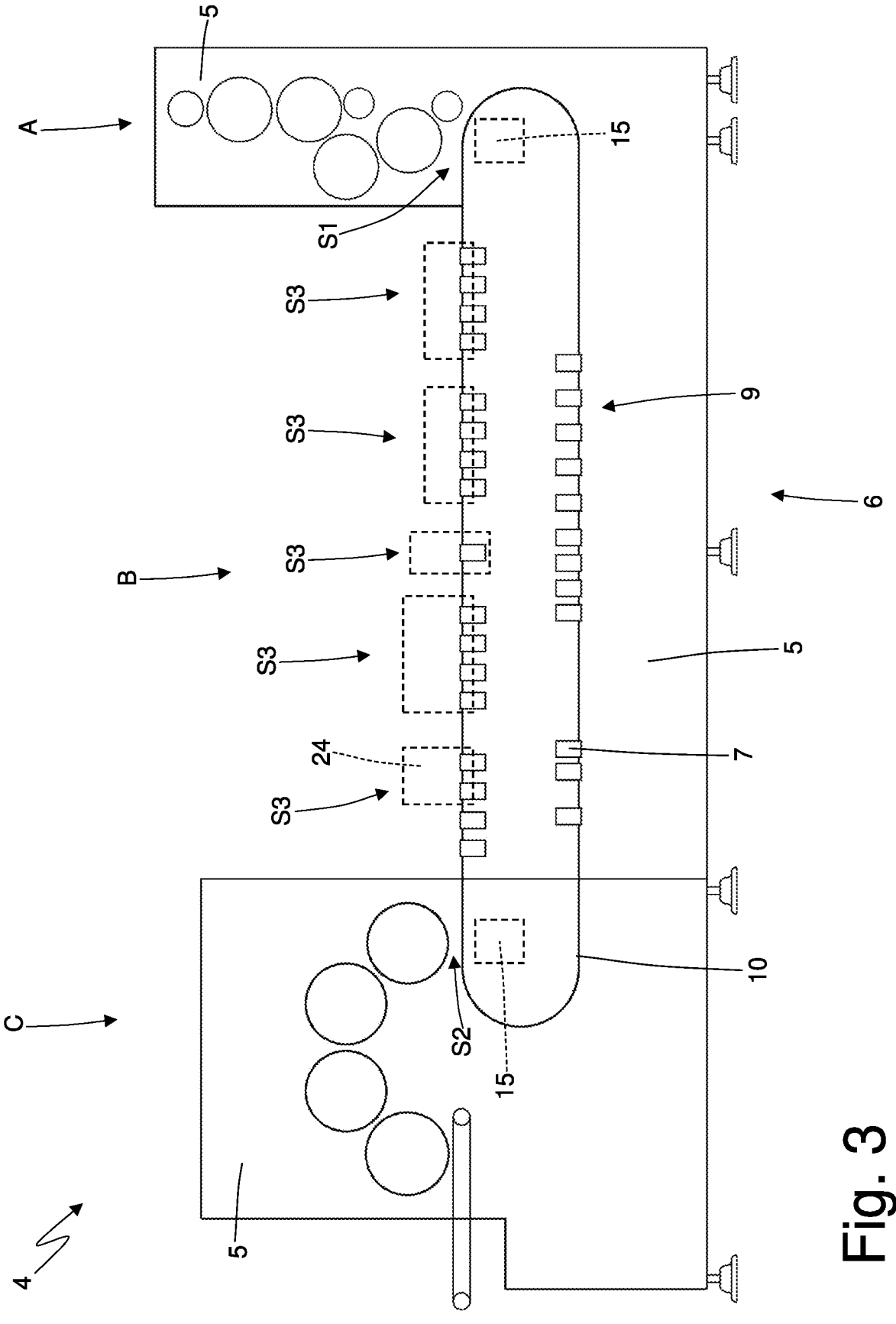
FIG. 3 is a front and schematic view of a manufacturing machine for the production of the cartridge of FIG. 1 provided with a transport system made according to the present invention.

Number 4 in FIG. 3 denotes, as a whole, a manufacturing machine for the production of the cartridges 1 described above.

The manufacturing machine 4 comprises an assembly section in which the materials making up the cartridges 1 are assembled to manufacture the cartridges 1 and a feeding section, in which the materials making up the cartridges 1 are received and sorted towards the assembly section.

As illustrated in FIG. 3, the assembly section of the manufacturing machine 4 comprises an initial part A, an intermediate part B, and a final part C.

The manufacturing machine 4 comprises a support member 5 (namely, a frame) which rests on the ground by means of legs and frontally has a vertical wall on which the operating members of the three parts A, B and C are mounted. The intermediate part B of the manufacturing machine comprises a transport system 6 which moves the partially completed cartridges 1 (namely, still without certain elements) along a working path P (illustrated in FIGS. 4-9) that extends between an inlet station S1 and an outlet station S2. The transport system 6 comprises a plurality of movable units 7 in each of which (at least) one seat 8 (illustrated in FIGS. 4-9) is provided, which is designed to house a partially completed cartridge 1 in a stable and precise position. According to other embodiments not illustrated, each movable unit 7 has a different number of seats 8 (generally from a minimum of one seat 8 to a maximum of six/eight seats 8).

The transport system 6 comprises a conveyor 9 for cyclically moving each movable unit 7 along the annular working path P with an intermittent movement (in a stepwise manner) which provides for cyclically alternating movement steps in which the conveyor 9 moves the movable units 7 and stop steps in which the conveyor 9 keeps the movable units 7 still.

The working path P comprises a straight operating section which extends from an inlet station S1 (establishing the end of the initial part A and the beginning of the intermediate part B) in which the partially completed cartridges 1 are cyclically fed to the seats 8 of the movable units 7 to an outlet station S2 (establishing the end of the intermediate part B and the beginning of the final part C) in which the partially completed cartridges 1 (to which elements have been added while passing through the intermediate part B) leave the seats 8 of the movable units 7. Furthermore, as illustrated in FIG. 3, the working path P comprises a straight return section parallel and opposite to the straight operating section and two semi-circular connecting sections that connect the operating section and the return section to one another.

According to a preferred embodiment, the conveyor 9 comprises an annular guide 10 (namely, closed in a loop on itself) which is arranged in a fixed position along the working path P; in particular, the annular guide 10 is formed by a single fixed track (namely, devoid of movement) which is arranged along the working path P. Furthermore, the conveyor 9 comprises a plurality of slides, each supporting a corresponding movable unit 7 and coupled to the guide 10 to slide freely along the guide 10. Finally, the conveyor 9 comprises a linear electric motor, which moves the slides carrying the movable units 7 along the working path P; the linear electric motor comprises an annular stator (namely, a fixed primary) which is arranged in a fixed position along the guide 10 and a plurality of movable sliders (namely, movable secondaries), each electromagnetically coupled to the stator to receive from the same stator a driving force and is rigidly connected to a corresponding slide.

According to a different embodiment not illustrated, the conveyor 9 is a belt conveyor and comprises (at least) a flexible belt that supports the movable units 7 and is closed in a loop around two end pulleys (at least one of which is motorised).

As illustrated in FIG. 3, along the working path P (namely, between the inlet station S1 and the outlet station S2) working stations S3 are arranged in succession (namely, one after the other) in which processing is carried out (for example, additions of elements, welding, weighing, optical or electrical controls, bending . . . ) on the partially completed cartridges 1 carried by the seats 8 of the movable units 7.

As illustrated in FIGS. 4-9, each seat 8 is delimited by a movable wall 11 and by a fixed wall 12 facing one another and opposite one another so that the cartridge 1 can be housed between the movable wall 11 and the fixed wall 12; namely, when a cartridge 1 is inserted in a corresponding seat 8 it is located between the movable wall 11 and the fixed wall 12 that press the same in between one another. The fixed wall 12 is rigidly constrained to the movable unit 7 and, hence, does not perform any type of movement relative to the movable unit 7; whereas, the movable wall 11 is mounted in a sliding manner on the movable unit 7 to linearly slide along a release direction D1 (preferably but not necessarily horizontal) parallel to the working path P or along a gripping direction D2 that is parallel and opposite to the release direction D1.

In other words, in each movable unit 7, the movable wall 11 is mounted in a sliding manner on the movable unit 7 only to linearly slide, relative to the movable unit 7, along the directions D1 and D2, which are parallel to the path P.

The movable wall 11 of each seat 8 is mounted in a sliding manner on the movable unit 7 to move away and closer from/to the fixed wall 12 (by linearly sliding along the gripping direction D2 and the release direction D1) between a gripping position (illustrated in FIGS. 7, 8 and 9) in which the movable wall 11 is at a minimum distance from the fixed wall 12 (and therefore gently presses the cartridge 1 against the fixed wall 12) and a release position (illustrated in FIGS. 4, 5 and 6) in which the movable wall 11 is at a maximum distance from the fixed wall 12 (and therefore allows the cartridge 1 to enter or exit the seat 8 without effort and without sliding against the walls 11 and 12). In other words, the walls 11 and 12 of each seat 8 form the two jaws of a gripper which is designed to close around a cartridge 1 to tighten, and therefore house, the cartridge 1.

According to a different embodiment not illustrated, in each seat 8 both walls 11 and 12 are movable, namely, are mounted on the corresponding movable unit 7 in a movable manner.

As illustrated in FIGS. 4-9, the movable unit 7 comprises an elastic element 13 pushing the movable wall 11 towards the fixed wall 12 and therefore towards the gripping position with a given and calibrated elastic force so as to firmly hold a cartridge 1 inside the seat 8 without, at the same time, damaging the cartridge 1. Namely, the combination of the walls 11 and the elastic element 13 form an elastic gripper designed for holding a cartridge 1 with a constant elastically generated gripping force.

As illustrated in FIGS. 4-9, the movable unit 7 comprises a control appendage 14 which is mechanically (rigidly) connected to the movable wall 11, is movable in order to move the movable wall 11 away from the fixed wall 12 and therefore move the movable wall 11 towards the release position, and is designed to be moved (according to the methods described in the following) from the outside of the movable unit 7 (namely, from the outside of the conveyor 9).

In other words, in each movable unit 7, the elastic element 13 is configured to push the control appendage 14 against the rest of the movable unit 7 and the control appendage 14 is arranged behind the movable unit 7 relative to a travel direction of the working path P.

Advantageously, the fact of providing a conveyor 9 with a linear electric motor which moves the slides carrying the units 7 allows the movement of single units 7 independently of the others in the two feeding directions D1 and D2. This operation is therefore facilitated compared to the use of a different transport system (e.g., belt or conveyor belt) by means of which the movement in the two directions would inevitably involve all the units 7 bound to one another. In this way the system 6 is therefore particularly flexible.

As illustrated in FIG. 3, the transport system 6 comprises (at least) two operating devices 15 (illustrated schematically) which are arranged in the inlet station S1 (in which it is necessary to "open" all the seats 8 of the movable units 7 to allow the insertion of the cartridges 1 inside the seats 8) and in the outlet station S2 (in which it is necessary to "open" all the seats 8 of the movable units 7 to allow the withdrawal of the cartridges 1 from the seats 8), respectively.

Each operating device 15 is on the outside and independent of the movable units 7, is arranged in a fixed position along the working path P, and is designed to act upon the control appendages 14 of the movable units 7 to move (temporarily) the corresponding movable walls 11 from the gripping position to the release position by expanding the corresponding elastic elements 13; namely, each operating device 15 is on the outside and independent of the movable unit 7, is arranged along the working path P, and is designed to act upon the movable wall 11 of each movable unit 7 to move the movable wall 11 away from the fixed wall 12 against the force generated by the elastic element 13. The control appendage 14 of each movable unit 7 is rigidly connected to the movable wall 11 and is designed to be moved by the operating device 15 relative to the rest of the movable unit 7 in order to change the distance of the movable wall 11 relative to the fixed wall 12.

As illustrated in FIGS. 4-9, each operating device 15 comprises a countering member 16 which has the function of engaging (namely, coming into contact with) the control appendage 14 of the movable wall 11 of each movable unit 7 and is mounted in a movable manner to move along a countering direction D3 (preferably but not necessarily vertical) which is perpendicular to the working path P (namely, it is perpendicular to the release direction D1 and to the gripping direction D2). Each countering member 16 moves along the countering direction D3 between an operating position (illustrated in FIGS. 4-8) in which the countering member 16 is located along the trajectory followed by the control appendages 14 (while the movable units 7 move along the working path P) and, hence, prevents the control appendages 14 from moving past the countering member 16, and a rest position (illustrated in FIG. 9) in which the countering member 16 is located externally (in a lower position) to the trajectory followed by the control appendages 14 (while the movable units 7 move along the working path P) and, hence, does not interfere in any way with the movement of the control appendages 14. Each operating device 15 comprises a linear actuator 17 which moves the countering member 16 along the countering direction D3 between the operating position (illustrated in FIGS. 4-8) and the rest position (illustrated in FIG. 9).

The operation of the transport system 6 is described in the following when a movable unit 7 having an empty seat 8 must receive a cartridge 1 in the inlet station S1.

Figures 4, 5, 6:
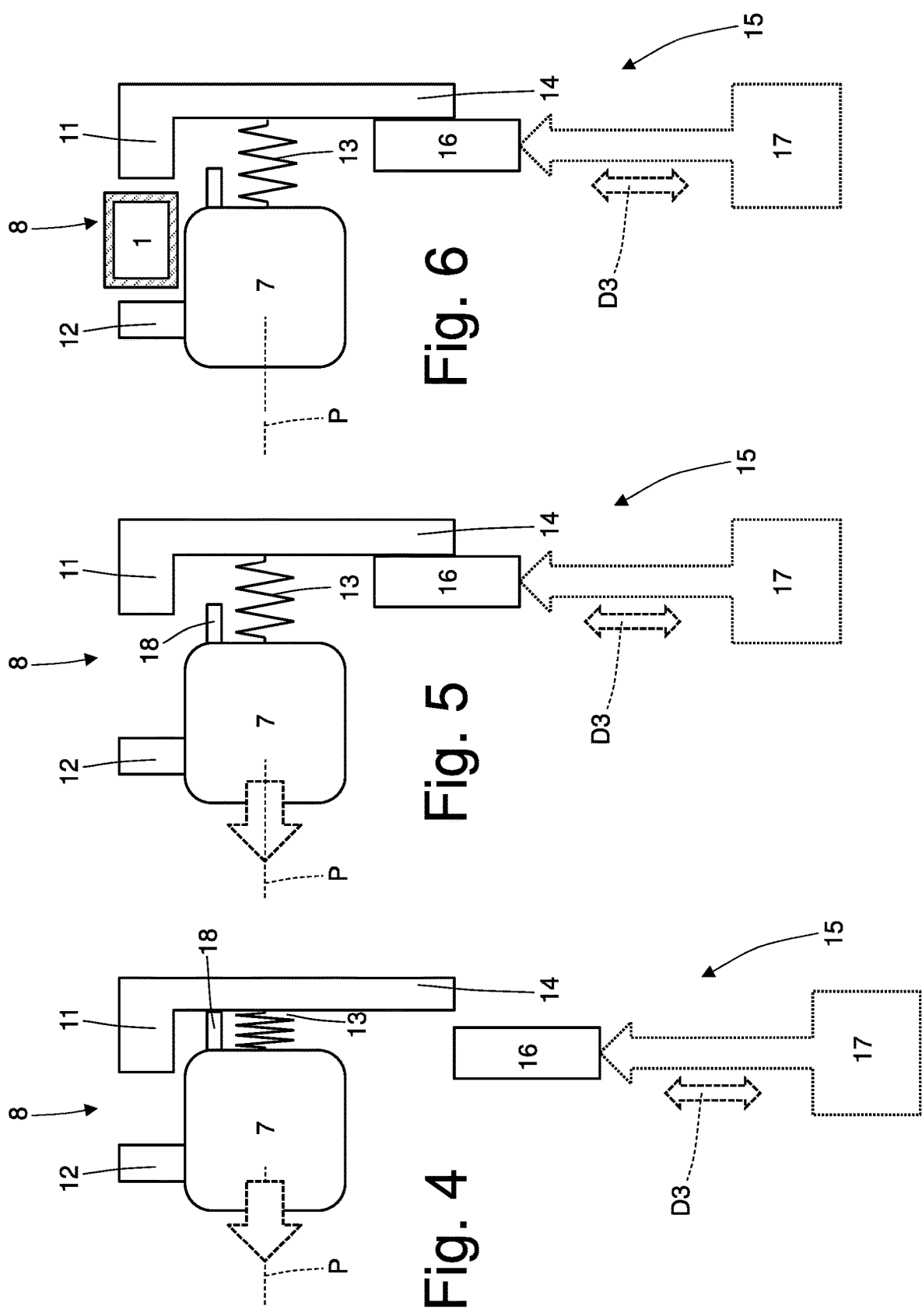
FIGS. 4-9 illustrate an operating sequence of a part of the transport system of FIG. 3.

As illustrated in FIG. 4, in the inlet station S1 the linear actuator 17 actuates the countering member 16 towards the operating position while the movable unit 7 is moving forward along the working path P towards the inlet station S1.

As illustrated in FIG. 5, by continuing the forward stroke along the working path P, since the countering member 16 is in the operating position, the movable unit 7 results with its control appendage 14 against the countering member 16, which prevents the control appendage 14 from moving past its stroke: consequently, the elastic member 13 deforms to allow the movable wall 11 to move (being held still by the countering member 16 abutting against the control appendage 14) relative to the rest of the movable unit 7 (carrying the fixed wall 12) which still moves a little forward along the working path P. In particular, once the control appendage 14 has abutted against the countering member 16, the movable unit 7 moves forward along the working path P by a distance corresponding to the difference in distance between the two walls 11 and 12 between the gripping position (in which the walls 11 and 12 are at the closest distance to one another) and the release position (in which the walls 11 and 12 are at the greatest distance from one another). Therefore, the seat 8 moves from the gripping position to the release position due to the mutual separation of the two walls 11 and 12.

As illustrated in FIG. 6, once the seat 8 has moved from the gripping position to the release position due to the mutual separation of the two walls 11 and 12, the movable unit 7 is stopped (namely, it stops its forward movement along the working path P); at this point the cartridge 1 can be easily inserted into the seat 8 which is in the gripping position.

Figures 7, 8, 9:
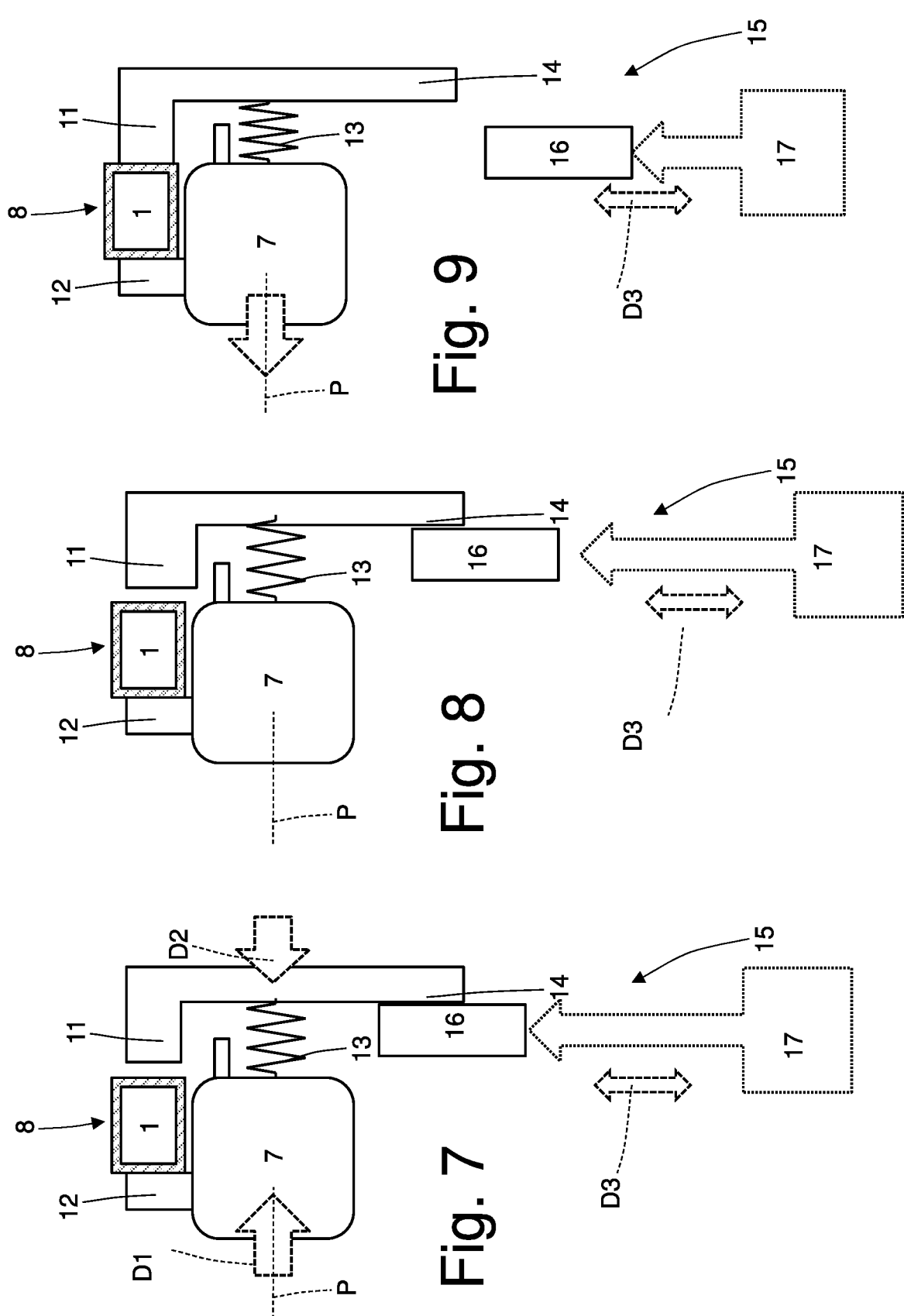

As illustrated in FIG. 7, once the cartridge 1 has been inserted into the seat 8 which is in the gripping position, the movable unit 7 moves backwards along the working path P to bring together the two walls 11 and 12 since, due to the effect of the elastic force generated by the elastic element 13, as the movable unit 7 moves backwards along the working path P, the movable wall 11 moves along the gripping direction D2, approaching the fixed wall 12, until the latter abuts against the cartridge 1.

As illustrated in FIG. 8, simultaneously with the backward movement along the working path P of the unit 7, the countering member 16 moves back towards the respective rest position determined by the actuation of the linear actuator 17.

As illustrated in FIG. 9, once the countering member 16 is arranged in (namely, reaches the) respective rest position, the control appendage 14 is moved (detached, namely, no longer abutting) away from the countering member 16, and the movable wall 11 moves into abutment against the cartridge 1, tightening (pinching) the cartridge 1 together with the fixed wall 12. At this point the movable unit 7 can move forward again along the working path P to exit the inlet station S1 and then continue towards the working stations S3.

In the outlet station S2 to release the cartridge 1 held between the two walls 11 and 12 of the seat 8, the seat 8 is initially opened (namely, moved from the gripping position to the release position) as previously described with reference to FIGS. 4 and 5; subsequently the cartridge 1 is removed from the seat 8 which is in the release position, the movable unit 7 is moved backwards along the working path P to return to the seat 8 (empty) in the gripping position (as illustrated in the FIG. 7) and then the countering member 16 is brought, by the linear actuator 17, to the rest position to detach the control appendage 14 from the same countering member 16 (as illustrated in FIG. 8). Once the control appendage 14 and the countering member 16 are no longer abutting, the movable unit 7 can move forward again along the working path P to exit the outlet station S2.

In other words, to open a seat 8, the countering member 16 is arranged in the operative position (namely, along the trajectory followed by the control appendage 14), the movable unit 7 is moved forward along the working path P until bringing the control appendage 14 into contact with the countering member 16, and the movable unit 7 is moved further forward along the working path P, once the control appendage 14 is in contact with the countering member 16, to move the movable wall 11 away from the fixed wall 12 and therefore open the seat 8. Furthermore, to close a seat 8, the movable unit 7 is moved backwards along the working path P to bring the movable wall 11 closer to the fixed wall 12 and then close the seat 8 and subsequently detach the control appendage 14 from the countering member 16, and finally the countering member 16 is arranged in the rest position (on the outside of the trajectory followed by the control appendage 14).

According to a preferred embodiment, each movable unit 7 has an end of stroke element 18 which limits the approach stroke of the movable wall 11 to the fixed wall 12 when the seat 8 is empty; the size of the end of stroke element 18 is such that it does not abut against the movable wall 11 (in particular with the control appendage 14 integral with the movable wall 11) when a cartridge 1 is arranged in the seat 8 (as illustrated in FIGS. 7, 8 and 9).

The present invention can find application in the production of any type of disposable cartridge not necessarily for electronic cigarettes, for example a disposable cartridge for medical devices (namely, a disposable cartridge containing a drug or the like); moreover, the present invention can find application in the production of any other type of article other than a disposable cartridge.

The embodiments described herein can be combined with one another without departing from the scope of the present invention.

The transport system 6 described above has numerous advantages.

In the first place, the conveying system 6 described above allows to achieve high hourly productivity (namely, a number of pieces produced in the unit of time) while guaranteeing a high-quality standard of the cartridges 1. This result is obtained due to the fact that the transport system 6 is designed to hold the more or less complete cartridges 1 in a delicate way (so as not to damage the same) and, at the same time, in a sufficiently firm way to ensure that the more or less complete cartridges 1 are not lost (or in any case not are subject to unwanted shifting) during movement even when said movement imparts relatively high accelerations and decelerations to the more or less complete cartridges 1.

In particular, the transport system 6 described above allows holding in the correct way also cartridges 1 having a complex shape and this result is obtained due to the fact that each seat 8 has a linear movement (namely, the movable wall 11 of each seat 8 moves in a linear motion) parallel to the direction of motion of the movable unit 7 (namely, parallel to the working path P). In other words, the transport system 6 described above allows to obtain a high coupling precision between the walls 11 and 12 of each seat 8 and the respective cartridge 1 at the holding areas found on the cartridge 1.

Furthermore, the conveying system 6 described above is also easy and inexpensive to produce, since it is formed by structurally simple elements which perform few and easily executed movements.

LIST OF REFERENCE NUMBERS OF THE FIGURES

1 cartridge
2 main body
3 cap
4 manufacturing machine
5 support member
6 transport system
7 movable unit
8 seats
9 conveyor
10 annular guide
11 movable wall
12 fixed wall
13 elastic element
14 control appendage
15 operating device
16 countering member
17 linear actuator
18 end of stroke element
A initial part
B intermediate part
C final part
P working path
S1 inlet station
S2 outlet station
S3 working station
D1 release direction
D2 gripping direction
D3 countering direction

The invention claimed is:

1. A transport system (6) for an article (1) comprising:
a movable unit (7) provided with at least one seat (8), which is designed to contain the article (1), is delimited by a first wall (11) and by a second wall (12) facing one another and opposite one another, so that the article (1) can be housed between the first wall (11) and the second wall (12), and has an elastic element (13) pushing the two walls (11, 12) towards one another;
a conveyor (9) designed to move the movable unit (7) along a path (P); and
at least one operating device (15), which is arranged in a station (SI, S2, is on the outside and independent of the movable unit (7), is arranged along the path (P) and is designed to act upon the first wall (11) in order to move the first wall (11) away from the second wall (12) against the force generated by the elastic element (13);
wherein the first wall (11) is mounted on the movable unit (7) in a movable manner to move relative to the movable unit (7),
wherein the movable unit (7) comprises a control appendage (14) which is rigidly connected to the first wall (11) and is designed to be moved by the operating device (15) relative to the rest of the movable unit (7) to change the distance of the first wall (11) relative to the second wall (12),
wherein the first wall (11) is mounted in a sliding manner to only linearly slide relative to the movable unit (7) so that the movement of the first wall (11) relative to the second wall (12) takes place only and exclusively by means of a linear translation, and wherein the operating device (15) comprises a countering member (16), which is movable between an operating position in which the countering member (16) is located along a trajectory followed by the control appendage (14) and, hence, prevents the control appendage (14) from moving past the station (S1, S2), and a rest position, in which the countering member (16) is on the outside of the trajectory followed by the control appendage (14) and, hence, does not interfere in any way with the movement of the control appendage (14), allowing the movable unit (7) to move past the station (S1, S2).

2. The transport system (6) according to claim 1, wherein the first wall (11) is mounted on the movable unit (7) in a sliding manner so as to only slide, relative to the movable unit (7), along a direction (DI, D2), which is parallel to the path (P).

3. The transport system (6) according to claim 1, wherein the second wall (12) is mounted on the movable unit (7) in a fixed position.

4. The transport system (6) according to claim 1, wherein the operating device (15) comprises a linear actuator (17) configured to translate the countering member (16) between the operating position and the rest position.

5. The transport system (6) according to claim 1, wherein the operating device (15) is configured for:
arranging the countering member (16) along the trajectory followed by the control appendage (14) before the movable unit (7) arrives at the station (SI, S2); and
arranging the countering member (16) on the outside of the trajectory followed by the control appendage (14) to allow the movable unit (7) to move past the station (SI, S2).

6. The transport system (6) according to claim 1, wherein the elastic element (13) is configured to push the control appendage (14) against the rest of the movable unit (7).

7. The transport system (6) according to claim 1, wherein the control appendage (14) is arranged behind the movable unit (7) relative to a direction in which the path (P) is covered.

8. The transport system (6) according to claim 1, wherein the article (1) is an at least partially complete cartridge for an electronic cigarette.

9. The transport system (6) according to claim 1, wherein the movable unit (7) comprises an end of stroke element (18) which limits the approach stroke of the first wall (11) to the second wall (12) when the seat (8) is empty.

10. The transport system (6) according to claim 9, wherein the dimension of the end of stroke element (18) is such that it does not abut against the first wall (11) when the article (1) is arranged in the seat (8).

11. The transport system (6) according to claim 9, wherein a dimension of the end of stroke element (18) is such that it does not abut against the first wall (11) when the article (1) is arranged in the seat (8).

12. A method to control the transport system (6) according to claim 1 and comprising, to open the seat (8), the steps of:
arranging a countering member (16) along a trajectory followed by the control appendage (14);
moving the movable unit (7) forward along the path (P) until the control appendage (14), in the station (SI, S2), comes into contact with the countering member (16); and
moving the movable unit (7) further forward along the path (P), once the control appendage (14) is in contact with the countering member {16), to move the first wall (11) away from the second wall (12) and therefore open the seat (8).

13. The control method according to claim 12 and comprising, in order to close the seat (8), the steps of:
moving the movable unit (7) backward along the path (P) to move the first wall (11) closer to the second wall (12) and then close the seat (8) in order to mutually detach the control appendage (14) from the countering member (16); and arranging the countering member (16) on the outside of the trajectory followed by the control appendage (14) to allow the movable unit (7) to move past the station (SI, S2).

14. A transport system (6) for an article (1) comprising:
a movable unit (7) provided with at least one seat (8), which is designed to contain the article (1), is delimited by a first wall (11) and by a second wall (12) facing one another and opposite one another, so that the article (1) can be housed between the first wall (11) and the second wall (12), and has an elastic element (13) pushing the two walls (11, 12) towards one another;
a conveyor (9) designed to move the movable unit (7) along a path (P);
and at least one operating device (15), which is arranged in a station (S1, S2), is on the outside and independent of the movable unit (7), is arranged along the path (P) and is designed to act upon the first wall (11) in order to move the first wall (11) away from the second wall (12) against the force generated by the elastic element (13);
wherein the first wall (11) is mounted on the movable unit (7) in a movable manner to move relative to the movable unit (7);
wherein the movable unit (7) comprises a control appendage (14) which is rigidly connected to the first wall (11) and is designed to be moved by the operating device (15) relative to the rest of the movable unit (7) to change the distance of the first wall (11) relative to the second wall (12);
wherein the first wall (11) is mounted in a sliding manner to only linearly slide relative to the movable unit (7) so that the movement of the first wall (11) relative to the second wall (12) takes place only and exclusively by means of a linear translation; and
wherein the movable unit (7) comprises an end of stroke element (18) which limits the approach stroke of the first wall (11) to the second wall (12) when the seat (8) is empty.

15. A method to control the transport system (6) according to claim 14 and comprising, to open the seat (8), the steps of:
arranging a countering member (16) along a trajectory followed by the control appendage (14);
moving the movable unit (7) forward along the path (P) until the control appendage (14), in the station (S1, S2), comes into contact with the countering member (16); and
moving the movable unit (7) further forward along the path (P), once the control appendage (14) is in contact with the countering member (16), to move the first wall (11) away from the second wall (12) and therefore open the seat (8).

16. The control method according to claim 15 and comprising, in order to close the seat (8), the steps of:
moving the movable unit (7) backward along the path (P) to move the first wall (11) closer to the second wall (12) and then close the seat (8) in order to mutually detach the control appendage (14) from the countering member (16); and arranging the countering member (16) on the outside of the trajectory followed by the control appendage (14) to allow the movable unit (7) to move past the station (S1, S2).

\* \* \* \* \*